US011567172B2

(12) United States Patent
Blob

(10) Patent No.: US 11,567,172 B2
(45) Date of Patent: Jan. 31, 2023

(54) METHOD FOR CAPTURING AT LEAST ONE OBJECT, DEVICE OF A SENSOR APPARATUS, SENSOR APPARATUS AND DRIVER ASSISTANCE SYSTEM WITH AT LEAST ONE SENSOR APPARATUS

(71) Applicant: VALEO Schalter und Sensoren GmbH, Bietigheim-Bissingen (DE)

(72) Inventor: Philipp Blob, Bietigheim-Bissingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 1168 days.

(21) Appl. No.: 16/087,547

(22) PCT Filed: Mar. 23, 2017

(86) PCT No.: PCT/EP2017/056916
§ 371 (c)(1),
(2) Date: Sep. 21, 2018

(87) PCT Pub. No.: WO2017/162788
PCT Pub. Date: Sep. 28, 2017

(65) Prior Publication Data
US 2021/0199763 A1    Jul. 1, 2021

(30) Foreign Application Priority Data
Mar. 24, 2016 (DE) .................. 10 2016 105 536.0

(51) Int. Cl.
*G01S 7/48* (2006.01)
*G01S 17/931* (2020.01)
*G01S 17/58* (2006.01)

(52) U.S. Cl.
CPC ............ *G01S 7/4808* (2013.01); *G01S 17/58* (2013.01); *G01S 17/931* (2020.01)

(58) Field of Classification Search
CPC ...... G01S 7/4808; G01S 17/58; G01S 17/931; G01S 17/00; G01S 17/42
See application file for complete search history.

(56) References Cited

U.S. PATENT DOCUMENTS 5,751,211 A * 5/1998 Shirai ................... B60W 10/10
340/904
9,097,800 B1 * 8/2015 Zhu ........................ G01S 7/4802
(Continued)

FOREIGN PATENT DOCUMENTS

| CN | 102378999 A | 3/2012 |
| CN | 102884443 A | 1/2013 |

(Continued)

OTHER PUBLICATIONS

International Search Report issued in PCT/EP2017/056916 dated Jun. 21, 2017 (2 pages).

(Continued)

*Primary Examiner* — Yuqing Xiao
*Assistant Examiner* — Benjamin Richard Hebert
(74) *Attorney, Agent, or Firm* — Osha Bergman Watanabe & Burton LLP

(57) ABSTRACT

A method is described for the in particular optical capture of at least one object (18, 20) with at least one sensor apparatus (14) of a vehicle (10), a device (34) of a sensor apparatus (14), a sensor apparatus (14) and a driver assistance system (12) with at least one sensor apparatus (14). In the method, in particular optical transmitted signals (36) are transmitted into a monitoring region (16) with the at least one sensor apparatus (14) and transmitted signals (36) reflected from object points (40) of the at least one object (18, 20) are captured as received signals (38) with angular resolution with reference to a main monitoring direction (42) of the at least one sensor apparatus (14). A spatial distribution of the object points (40) of the at least one object (18, 20) relative (Continued)

to the at least one sensor apparatus (14) is determined from a relationship between the transmitted signals (36) and the received signals (38), and the at least one object (18, 20) is categorized as stationary or non-stationary. A spatial density of the captured object points (40) in at least one region of the at least one object (20) is determined, and if the density of the captured object points (40) is smaller than a predetermined or predeterminable threshold value, the at least one object (20) is categorized as stationary.

9 Claims, 7 Drawing Sheets

(56) References Cited

U.S. PATENT DOCUMENTS

| | | | |
|---|---|---|---|
| 9,383,753 B1 * | 7/2016 | Templeton | G01S 7/4865 |
| 2004/0130702 A1 | 7/2004 | Jupp et al. | |
| 2008/0166024 A1 | 7/2008 | Iketani | |
| 2012/0130628 A1 | 5/2012 | Dintzer et al. | |
| 2014/0368807 A1 | 12/2014 | Rogan | |
| 2015/0120244 A1 | 4/2015 | Ma et al. | |
| 2016/0040979 A1 | 2/2016 | Takiguchi et al. | |

FOREIGN PATENT DOCUMENTS

| | | |
|---|---|---|
| DE | 199 44 542 A1 | 4/2001 |
| DE | 101 41 055 A1 | 3/2003 |
| DE | 103 48 216 A1 | 5/2004 |
| DE | 102013113570 A1 | 9/2014 |
| EP | 0 932 052 A2 | 7/1999 |
| EP | 1326087 B1 | 6/2006 |
| JP | 2004-271513 A | 9/2004 |

OTHER PUBLICATIONS

Written Opinion of the International Searching Authority issued in PCT/EP2017/056916 dated Jun. 21, 2017 (8 pages).
German Search Report issued in DE 10 2016 105 536.0 dated Dec. 2, 2016 (7 pages).
The First Office Action in corresponding Chinese Application No. 201780019287.4, dated Oct. 28, 2021 (24 pages).

* cited by examiner

METHOD FOR CAPTURING AT LEAST ONE OBJECT, DEVICE OF A SENSOR APPARATUS, SENSOR APPARATUS AND DRIVER ASSISTANCE SYSTEM WITH AT LEAST ONE SENSOR APPARATUS

TECHNICAL FIELD

The invention relates to a method for the in particular optical capture of at least one object with at least one sensor apparatus of a vehicle in which with the at least one sensor apparatus in particular optical transmitted signals are transmitted into a monitoring region and transmitted signals reflected from object points of the at least one object are captured as received signals with angular resolution with reference to a main monitoring direction of the at least one sensor apparatus, and a spatial distribution of the object points of the at least one object relative to the at least one sensor apparatus is determined from a relationship between the transmitted signals and the received signals, and the at least one object is categorized as stationary or non-stationary.

The invention further relates to a device of an in particular optical sensor apparatus of a vehicle for in particular optical capture of at least one object, in particular for carrying out the method according to the invention, with at least one analysis component for determining at least one angular resolution of propagation directions of transmitted signals and/or received signals with reference to a main monitoring direction of the at least one sensor apparatus and for determining a spatial distribution of object points of the at least one object at which the transmitted signals are reflected and returned to the sensor apparatus as received signals, relative to the at least one sensor apparatus from a relationship between the transmitted signals and the received signals, and wherein the device comprises at least one categorization component for categorizing the at least one object as stationary or non-stationary.

The invention further relates to a sensor apparatus of a vehicle with at least one device for in particular optical capture of at least one object, in particular for carrying out the method according to the invention, with at least one transmitter for transmitting in particular optical transmitted signals into a monitoring region and at least one receiver for receiving transmitted signals reflected at object points of the at least one object as received signals, wherein the device comprises at least one analysis component for determining at least one angular resolution of propagation directions of the transmitted signals and/or the received signals with reference to a main monitoring direction of the at least one sensor apparatus and for determining a spatial distribution of the object points of the at least one object relative to the at least one sensor apparatus from a relationship between the transmitted signals and the received signals, and wherein the device comprises at least one categorization component for categorizing the at least one object as stationary or non-stationary.

In addition the invention relates to a driver assistance system of a vehicle with at least one sensor apparatus with at least one device for in particular optical capture of at least one object, in particular for carrying out the method according to the invention, with at least one transmitter for transmitting in particular optical transmitted signals into a monitoring region and at least one receiver for receiving transmitted signals reflected at object points of the at least one object as received signals, wherein the device comprises at least one analysis component for determining at least one angular resolution of propagation directions of the transmitted signals and/or the received signals with reference to a main monitoring direction of the at least one sensor apparatus and for determining a spatial distribution of the object points of the at least one object relative to the at least one sensor apparatus from a relationship between the transmitted signals and the received signals, and wherein the device comprises at least one categorization component for categorizing the at least one object as stationary or non-stationary.

PRIOR ART

A radar device for the detection of distances and relative speeds of obstacles such as vehicles proceeding in front is known from EP 0 932 052 A2. The radar device has a stationary object identifier for recognizing stationary objects such as crash barriers and the like, and a stationary object separator for the removal of data that are identified as belonging to such a stationary object. The stationary object recognizer detects the peak density in a beat frequency spectrum that is determined as the difference between a transmitted and a received frequency of a radar beam. The stationary object recognizer recognizes peak groups as stationary objects whose peak densities lie above a predetermined value. It is thus possible to recognize stationary objects at the edge of the road from the peak density.

The invention addresses the object of designing a method, a device of a sensor apparatus, a sensor apparatus and a driver assistance system of the type referred to at the beginning, with which the recognition of stationary objects can be realized in an improved, in particular simplified and/or more precise, manner.

DISCLOSURE OF THE INVENTION

This object is achieved according to the invention with the method in that a spatial density of the captured object points in at least one region of the at least one object is determined, and if the density of the captured object points is lower than a predeterminable or predetermined threshold value, the at least one object is categorized as stationary.

According to the invention, a plurality of object points of the at least one object is captured with angular resolution. The angular dependency here is determined from the angle of a propagation direction of the corresponding transmitted signal and/or of the received signal to the main monitoring direction of the sensor apparatus. Advantageously the angular distances of the propagation directions of transmitted signals and/or received signals with which the monitoring region is captured can be equidistant. A distance between the captured object points at which the transmitted signals impinge and are reflected to form received signals changes depending on the orientation of the at least one object relative to the main monitoring direction. If the transmitted signals impinge upon a surface of the at least one object perpendicularly, a maximum density of captured object points is realized. The minimum density of the captured object points is realized in the case in which a surface of the at least one object runs almost parallel to the main monitoring direction, and the transmitted signals impinge upon the at least one object at a correspondingly small angle. This trigonometrical relationship is used according to the invention to distinguish stationary objects from non-stationary objects.

Advantageously, the transmitted signals can be realized as transmitted beams and/or the received signals as received beams. Advantageously, the transmitted signals and/or the received signals can be propagated optically or in some other way in space.

In terms of the invention, stationary or static means that the object is in particular stationary with respect to a roadway. Crash barriers or roadway boundaries in particular are stationary objects. In contrast to this, an unmoving vehicle is deemed not to be stationary in terms of the invention, since in principle it can move relative to the roadway. The aim is to distinguish stationary objects, in particular long crash barriers, from non-stationary objects, in particular other vehicles.

According to the invention, the density of the captured object points is determined in at least one region of the at least one object. The density is compared with a predeterminable threshold value. The threshold value can in particular be determined empirically in advance and stored in a memory device of the sensor apparatus. Alternatively or in addition, a threshold value can be determined dynamically while the sensor apparatus is operating.

If the density is lower than the predeterminable threshold value, it can be assumed that the object concerned is a stationary object. The object examined is then accordingly categorized as stationary. In terms of the invention, categorization means that at least one item of information, in particular a value, a magnitude and/or a signal or the like, is generated, which characterizes the object in terms of being stationary or non-stationary. This information can be made available for further processing, or as a decision basis for further method steps.

If the at least one object is categorized as stationary, at least one assessment magnitude and/or at least one probability magnitude can advantageously be generated and/or changed. Alternatively or in addition, if the at least one object is categorized as non-stationary, at least one corresponding opposing assessment magnitude can be generated and/or changed. A probability magnitude for the estimation of the at least one object as a stationary object can be negatively influenced with the opposing assessment magnitude. In particular, an assessment magnitude for the categorization as a stationary object can have a positive value, and the corresponding opposing assessment magnitude for the categorization as a non-stationary object the corresponding negative value, or vice versa.

The at least one assessment magnitude and/or the at least one probability magnitude can advantageously be a digital value or a counter. The at least one assessment magnitude and/or the at least one probability magnitude can be used either for a categorization of the object as stationary or non-stationary. The at least one assessment magnitude and/or the at least one probability magnitude can, in particular, be conveyed to an electronic apparatus of a driver assistance system.

Advantageously, the method according to the invention can be used in combination with a method for following objects, known as tracking. Objects can here be captured with the at least one sensor apparatus, and their temporal behaviour, in particular their distance and/or their relative speed with reference to the vehicle itself, can be tracked. Whether a position of an object changes in comparison to a previous performance of the method is determined here. With the method according to the invention, it is possible to avoid stationary objects such as crash barriers, the whole of which cannot be captured by the at least one sensor apparatus, being incorrectly tracked as non-stationary or dynamic. This incorrect assessment can be caused in that, during the ongoing performance of checking the monitoring region, different partial segments of the relevant stationary object, in particular of the crash barrier, are captured each time, which apparently move along with the vehicle. With the method according to the invention, such objects are captured as stationary, and classified accordingly.

Advantageously the at least one sensor apparatus can capture a monitoring region with the transmitted signals. The main monitoring direction of the at least one sensor apparatus can here pass through the centre of the monitoring region.

Advantageously, the method according to the invention can be used as a preliminary classification, as a subsequent classification or as a final classification of the captured objects as stationary or non-stationary. Through a preliminary classification it is possible to make a decision at an early stage of the monitoring as to whether a further tracking of the object is necessary and/or useful. The method can be designed more efficiently in this way, in particular to save time.

The at least one sensor apparatus can be advantageously arranged at a front face of a vehicle. In this way, the at least one sensor apparatus can monitor a monitoring region in the direction of travel in front of the vehicle. Alternatively or in addition, at least one sensor apparatus can be arranged at a side and/or a rear face of the vehicle.

Advantageously, a main monitoring direction of the at least one sensor apparatus can be aligned parallel to the usual direction of travel of the vehicle when the steering angle is central. Alternatively or in addition, at least one sensor apparatus can also be aligned differently.

A horizontal monitoring region can advantageously be monitored, in particular sampled, with the at least one sensor apparatus. In this way, as large a region as possible, in particular in front of the vehicle, can be captured with an appropriately large width. Alternatively or in addition, at least one monitoring region can comprise a more or less large vertical extent. Different heights can be monitored in this way with the at least one sensor apparatus.

An extension, in particular a direction of extent and/or a shape, of the at least one object can advantageously be determined before determining the density of the object points. The object concerned can in this way be better assigned. Potential concealments of a stationary object, in particular spaces in crash barriers, by a non-stationary object, in particular a vehicle, can in particular be recognized in this way.

A distance of the at least one object from a roadway centre can advantageously be determined. In this way a further criterion for the identification of the at least one object can be determined.

Advantageously, the object points of an object can be assigned to a cluster. It is possible to determine whether a density of the object points within at least one region of the cluster lies below the threshold value.

The at least one sensor device can advantageously be connected to or be part of at least one electronic control device of the vehicle, in particular a driver assistance system and/or a chassis controller and/or a driver information apparatus.

Advantageously the at least one sensor apparatus can be a scanning system. A monitoring region can here be sampled, which is to say scanned, with transmitted signals. The transmitted signals concerned, in particular transmitted beams, can so to speak be pivoted in terms of their propagation direction over the monitoring region for this purpose.

Advantageously the at least one sensor apparatus can be a laser-based distance measuring system. The laser-based distance measuring system comprises at least one laser, in particular a laser diode, as its light source. Pulsed transmitted beams can in particular be transmitted as transmitted signals with the at least one laser. Transmitted signals in frequency ranges that are visible or not visible to the human eye can be emitted with the laser. The laser-based distance measuring system can advantageously be a laser scanner. A monitoring region can be sampled with an in particular pulsed laser beam with a laser scanner.

The invention is used with a vehicle, in particular a motor vehicle. The invention can advantageously be used with a land vehicle, in particular a passenger car, truck, a bus, a motorcycle or the like.

In an advantageous embodiment of the method, the density of the captured object points can be determined in a segment of the at least one object facing away from the at least one sensor apparatus. The greater the distance of the corresponding captured object points is from the at least one sensor apparatus, the flatter is the angle with which the at least one transmitted signal impinges upon an object surface of an object that extends parallel to the main monitoring direction. A distance between neighbouring object points is correspondingly greater, and the density of the object points is correspondingly smaller there. Altogether a precision of the method can thus be improved.

The density can advantageously be determined from object points captured from a part of a cluster facing away from the at least one sensor apparatus.

Stationary objects, in particular crash barriers, have a correspondingly large extension in the direction of the main monitoring direction or of the roadway. In this way, correspondingly large density differences are recognizable, in particular at large distances. In the near field, in particular close to the at least one sensor apparatus, on the other hand, the object points lie closer together, so that a differentiation between stationary objects and non-stationary objects, in particular other vehicles, can be more difficult here.

A uniformly high density distribution can be acquired at non-stationary objects. With stationary objects, in particular in a segment facing away from the sensor apparatus, a different density distribution can be determined for the captured object points than with non-stationary objects. With distant, non-stationary objects, in particular vehicles, a side surface can be concealed by its rear face, and therefore cannot be captured by the at least one sensor apparatus. Stationary objects such as crash barriers, with their surfaces usually extending approximately parallel to the main monitoring direction, can be captured even at a greater distance from the at least one sensor apparatus.

In a further advantageous embodiment of the method, at least one direction of extension of the at least one object can be determined and, if at least one direction of extension runs parallel and/or obliquely to the main monitoring direction, the at least one object can be categorized as a stationary object.

An accuracy of the categorization of objects can be improved in this way. Crash barriers or roadway boundaries in particular usually run parallel to the roadway. Objects that extend perpendicularly to the roadway, i.e. perpendicularly to the main monitoring direction, are in this method not initially deemed to be stationary in terms of the invention. Objects that extend transversely or perpendicularly to the main monitoring direction are usually non-stationary in terms of the invention, if it is assumed that the vehicle with the sensor apparatus according to the invention is positioned in the direction of travel with the main monitoring direction and in the direction of travel along the roadway. A delimitation of the captured objects and object points can be performed in this way.

If at least one direction of extension of the at least one object runs parallel to and/or obliquely to the main monitoring direction, a corresponding assessment magnitude can advantageously be generated or changed and/or the method continued with a further check.

If at least one direction of extension of the at least one object does not run parallel and/or obliquely to the main monitoring direction, that is in particular transversely or perpendicularly to the main monitoring direction, the at least one object advantageously can be categorized as a non-stationary object. If appropriate a corresponding opposing assessment magnitude advantageously can then be generated or changed and/or the method ended.

The examination of whether the direction of extension of the at least one object runs parallel to and/or obliquely to the main monitoring direction can advantageously be carried out before the determination of the density of the captured object points. If the direction of extension is not parallel to or oblique to the main monitoring direction, it can be assumed in this case that the object is non-stationary. The at least one object can then be categorized as non-stationary. A further check can thus be unnecessary. The method can be carried out more efficiently and quickly in this way.

Alternatively or in addition, the determination of the at least one direction of extension can be carried out after the determination of the density of the captured object points. A previous categorization of the object can in this case be checked again. The precision of the assessment of a spatially stationary object can altogether be improved in this way.

In a further advantageous embodiment of the method, at least one direction of extension of the at least one object can be determined and, if at least two directions of extension of the at least one object that extend obliquely, in particular perpendicularly, to one another are captured, the at least one object can be categorized as non-stationary.

It is possible in this way to capture whether the at least one object has an edge or corner. In particular in the case of a vehicle, a rear face of the vehicle can extend perpendicularly to a side of the vehicle. The rear face can then extend orthogonally to the main monitoring direction. The sides of the vehicle can extend parallel to the main monitoring direction. The two directions of extension of the vehicle can be captured as being angled, in particular perpendicularly, to one another. Since a stationary object, in particular a crash barrier, does not usually extend in such a way, it can be assumed that the object is a non-stationary object, in particular a vehicle.

If at least two directions of extension of the at least one object which extend obliquely, in particular perpendicularly, to one another are captured, the method can advantageously be ended and/or a corresponding assessment magnitude for a stationary object can be generated or changed.

If at least two directions of extension of the at least one object that do not extend obliquely, in particular perpendicularly, to one another are captured, the at least one object can advantageously be categorized as non-stationary, and/or the method continued with a further check.

A check of the at least one object for at least two directions of extension and the determination of their course relative to one another can advantageously be carried out before a density is determined from the spatial distribution of the object points. If the at least two directions of extension run obliquely, in particular perpendicularly, to one another, the method can in this case be ended early. An appropriate assessment magnitude and/or a probability magnitude for a non-stationary object can here be generated or changed.

Alternatively or in addition, a check of the at least one object for at least two directions of extension and the determination of their course relative to one another can be carried out after a density is determined from the spatial distribution of the object points. The previous categorization of the object can in this case be checked again, in particular confirmed or not confirmed, or revoked if appropriate. Appropriate assessment magnitudes and/or probability magnitudes can advantageously be generated and/or changed for this purpose. A precision and/or speed of the method can altogether be improved in this way.

An algorithm, in which a plurality of neighbouring object points are allocated to a cluster, can advantageously be used to determine at least one direction of extension of the at least one object. A so-called Douglas-Peucker algorithm can in particular be used for this purpose. A line is drawn here through the clustered object points, the shape of the point cloud of the object points being retained. Either an L-shape or a straight line usually results when capturing stationary or non-stationary objects. In the case of an L-shape, this is a corner or edge of the corresponding object. In the case of a vehicle, this can be a transition from a rear face to a side surface. If a line is determined during the capture of the at least one direction of extension, its orientation with respect to the main monitoring direction can thus be determined. If the line extends perpendicularly or nearly perpendicularly to the main monitoring direction, a non-stationary object can be assumed. This can in particular be the case when the rear face of a vehicle is captured with the sensor apparatus. The sides of the vehicle can in this case be concealed by the rear face, and cannot be captured with the sensor apparatus. If the line runs parallel and/or obliquely, that is almost parallel, to the main monitoring direction, it can be assumed that it is not a rear face of a vehicle. It can then be a stationary object, in particular a crash barrier. It can, however, also be an elongated non-stationary object, in particular a truck or a bus which is located obliquely next to the vehicle with the sensor apparatus in such a way that its rear face is positioned outside the monitoring region of the at least one sensor apparatus. A more precise distinction can be made through the method according to the invention, in which a density of the captured object points in at least one region of the at least one object is additionally determined and compared with a predeterminable threshold value.

Advantageously, the classification of the at least one object can be restricted on the basis of the density of the object points to those cases in which the cluster cannot already be classified on the basis of the orientation of the direction of extension. This can sometimes be the case for objects where only one direction of extension can be captured parallel to and/or oblique to the main monitoring direction of the at least one sensor unit.

Through the combination of the capture of the density of the captured object points and the capture of the direction of extension of the object from the captured object points, a precision of the categorization into stationary objects and non-stationary objects can be improved. Thus in particular also concealments of stationary objects by non-stationary objects, in particular by vehicles, can be better compensated for.

In a further advantageous embodiment of the method, the method can be carried out a plurality of times, and the categorizations resulting therefrom can be processed statistically. A probability of a corresponding categorization can be determined in this way. Altogether the precision of the categorization of objects into stationary and non-stationary can thus be improved.

At least one probability magnitude for the assessment of the at least one object as stationary or non-stationary can advantageously be determined from the assessment magnitudes generated from the respective method executions.

The assessment magnitudes can advantageously be realized as counters. An initial value for a probability magnitude can in particular be realized at the first categorization of an object as stationary. The probability magnitude can be changed, in particular increased or reduced, at each further execution of the method on the same object, depending on the result of the method with the corresponding assessment magnitude or the opposing assessment magnitude. The probability magnitude can be employed for better evaluation of the object as stationary or non-stationary.

In a further advantageous embodiment of the method, a relative speed of the at least one object to the vehicle can be determined from a relationship between the transmitted signals and the received signals, and if the relative speed is of the general order of about 0 m/s, a categorization of the at least one object can be carried out on the basis of the density of the object points and/or of the direction of extension of the at least one object, otherwise no further categorization can be done. A further criterion for the evaluation of the object as stationary or non-stationary can be realized in this way. If the relative speed is generally of the order of about 0 m/s, the object is either moving with the same speed as the vehicle with the at least one sensor apparatus, or it is a stationary object extending parallel to the path of the vehicle, in particular a crash barrier. A vehicle moving in parallel with the same speed can thus be distinguished from a stationary object, in particular a crash barrier, through the use of at least one further categorization on the basis of the density of the object points and/or the direction of extension of the at least one object. If the object is captured with a relative speed that is opposed to the absolute speed of the vehicle with the at least one sensor apparatus, it can be assumed that it is an unmoving, non-stationary object or a stationary object. A further categorization can be omitted if the object is not relevant to the further path of the vehicle with the at least one sensor apparatus. Altogether the monitoring can thus be carried out faster and efficiently.

In a further advantageous embodiment of the method, a distance and/or a relative speed of at least one object point of the at least one object can be determined in accordance with an in particular sampling light time-of-flight measurement method, in particular a LiDAR or a LaDAR method. An angular resolution can easily be achieved with a sampling method. Distances and/or relative speeds can be determined very precisely with light time-of-flight measurements.

The object is further achieved according to the invention with the device in that the at least one categorization component comprises at least one density determination apparatus for determining at least one spatial density of the captured object points in at least one region of the at least one object, and at least one comparison apparatus for comparing the density with a predetermined or predeterminable threshold value and for categorizing the at least one object as stationary or non-stationary, depending on the result of the comparison.

The at least one analysis component can advantageously be or comprise at least one electronic circuit. The at least one analysis component can advantageously comprise at least one processor with which the method can be carried out.

The object is furthermore achieved according to the invention with the sensor apparatus in that the at least one categorization component comprises at least one density determination apparatus for determining at least one spatial density of the captured object points in at least one region of the at least one object, and at least one comparison apparatus for comparing the density with a predetermined or predeterminable threshold value and for categorizing the at least one object as stationary or non-stationary, depending on the result of the comparison.

In addition, the object is achieved according to the invention with the driver assistance system in that the at least one categorization component comprises at least one density determination apparatus for determining at least one spatial density of the captured object points in at least one region of the at least one object, and at least one comparison apparatus for comparing the density with a predetermined or predeterminable threshold value and for categorizing the at least one object as stationary or non-stationary, depending on the result of the comparison.

Apart from that, the features and advantages outlined in connection with the method according to the invention, the device according to the invention, the sensor apparatus according to the invention and the driver assistance system according to the invention and their respective advantageous embodiments apply appropriately to one another and vice versa. The individual features and advantages can, of course, be combined with one another, wherein further advantageous effects that go beyond the sum of the individual effects can emerge.

SHORT DESCRIPTION OF THE DRAWINGS

Further advantages, features and details of the invention emerge from the following description, in which an exemplary embodiment of the invention is explained in more detail with reference to the drawing. The expert will expediently also consider the features disclosed in combination in the drawing, the description and the claims individually, and group them into useful further combinations. Here, schematically, FIG. 1 shows a front view of a motor vehicle with a sensor apparatus for capturing objects that is a component of a driver assistance system of the vehicle;

Identical parts have been given the same reference signs in the figures.

FORM(S) OF EMBODIMENT OF THE INVENTION

Figure 1:
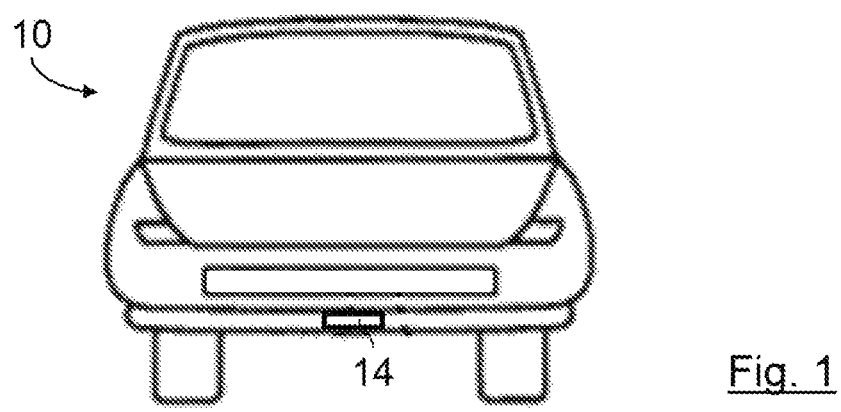

A vehicle 10 in the form of a passenger car is illustrated from the front in FIG. 1. The motor vehicle 10 has a driver assistance system 12 suggested in FIG. 2 with a sensor apparatus 14. By way of example, the sensor apparatus 14 is located in a front bumper of the motor vehicle 10. The driver assistance system 12 serves to assist a driver in control of driving functions of the motor vehicle 10, for example the speed, a braking function, or a steering.

A monitoring region 16 in front of the motor vehicle 10 in a driving direction of the motor vehicle 10 can be monitored for objects, for example vehicles 18 proceeding in front or crash barriers 20, with the sensor apparatus 14. The sensor apparatus 14 is designed for following objects, referred to as tracking. The objects are captured here with the at least one sensor apparatus, and their temporal behaviour, for example their distance and/or their relative speed with reference to the motor vehicle 10, tracked.

A distinction is drawn amongst the objects between stationary objects and non-stationary objects. Stationary objects, such as for example the crash barriers 20, are arranged in a fixed and unmoving manner at a roadway for the motor vehicle 10, for example a road 22 suggested in FIG. 2. Stationary objects can also be referred to as static objects. Non-stationary objects, for example other vehicles 18, are movable relative to the road 22. Non-stationary objects can be unmoving or can move relative to the road 22 and/or with a speed relative to the motor vehicle 10. Non-stationary objects can also be referred to as dynamic objects.

Figure 2:
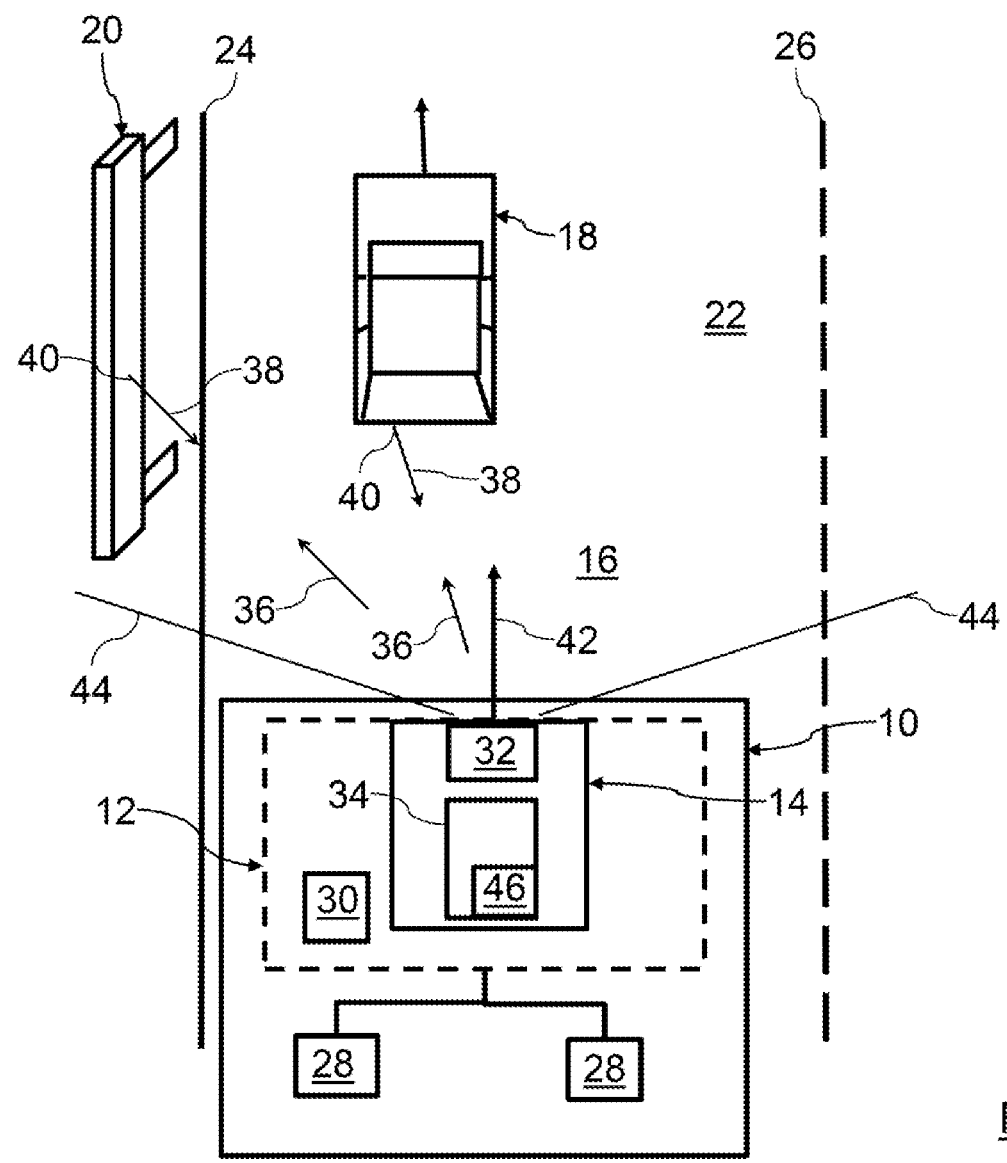
FIG. 2 shows a scenario of a driving situation of the motor vehicle, here only suggested schematically, of FIG. 1 on a road with a crash barrier and another vehicle proceeding in front.

A schematic plan view of a scenario of a driving situation of the motor vehicle 10 on the road 22 is shown by way of example in FIG. 2. The motor vehicle 10 is only suggested schematically here, and is not to scale. A sideline 24 of the road 22 is suggested by a solid line, and a centre line 26 as a dotted line.

The driver assistance system 12 is, as is suggested in FIG. 2, connected functionally, by way of example, to two functional apparatuses 28 of the motor vehicle 10. The functional apparatus 28 can, for example, be an engine controller, a steering controller or a braking system. One of the functional apparatuses 28 can, furthermore, comprise an output apparatus for the output of a visual and/or acoustic warning signal or information signal for the driver.

The driver assistance system 12 comprises an electronic apparatus 30. Information of the sensor apparatus 14 is processed with the electronic apparatus 30, and converted into appropriate control or signal information for the functional apparatuses 28.

The driver assistance system 12 comprises by way of example a sensor apparatus 14. In addition or as an alternative to the sensor apparatus 14 in the bumper of the motor vehicle 10, further sensor apparatuses 14 can also be arranged at other locations of the motor vehicle 10, for example at the side or at the rear face.

The sensor apparatus 14 is, for example, designed as a scanning LaDAR system. The sensor apparatus 14 comprises an optical component 32 and an electronic analysis component 34. The optical component 34 comprises a transmitter in the form of a laser diode, not drawn for the sake of greater clarity, and a receiver in the form of a receiving diode, also not drawn.

The optical component 32 furthermore comprises a deflecting mirror apparatus, not drawn. With the deflecting mirror apparatus, a pulsed transmitted beam 36 that is generated with the transmitter is transmitted at different angles, depending on the angular position of the deflecting mirror apparatus, into the monitoring region 16. In addition, received beams 38 reflected from an object, for example the vehicle 18 or the crash barrier 20, are deflected with the defecting mirror apparatus onto the receiving diode.

The sensor apparatus 14 works according to a light time-of-flight measurement method. A time between the transmission of a transmitted beam 36 and the reception of the corresponding received beam 38 is determined here, from which a distance of the corresponding object from the sensor apparatus 14 is determined. The relative speed of the corresponding object, for example the vehicle 18 proceeding in front, relative to the motor vehicle 10, can furthermore be determined with the sensor apparatus 14.

When the sensor apparatus 14 is operating, the deflecting mirror arrangement is moved in a horizontal direction, for example rotated, in coordination with the transmitter. The transmitted beam 36 is in this way rotated in a horizontal sense, in the plan view of FIG. 2 from left to right, for example, or from right to left. The corresponding object is thus sampled, with angular dependency, with the pulsed transmitted beam 36 as adjacent object points 40 at which the transmitted beam 36 is reflected and sent back as the received beam 38. By way of example, captured object points 40 are each suggested in FIGS. 3 to 6 as a cross in scenarios similar to the scenario of FIG. 2.

A main monitoring direction 42 of the sensor apparatus 14 is suggested by an arrow in FIG. 2. The main monitoring direction 42 runs, for example, in the direction of travel of the motor vehicle 10. When travelling round a bend, the direction of travel of the motor vehicle 10 can differ from the main monitoring direction 42. The lateral boundaries 44 of the monitoring region 16 are suggested in FIGS. 2 to 6 as lines. The monitoring region 16 is, for example, symmetrical with respect to the main monitoring direction 42. The monitoring region 16 can also be asymmetrical, which is not however significant for the invention. The monitoring region 16 is, for example, plane and runs horizontally. The monitoring region 16 can also have a more or less large vertical extent, depending on the design of the sensor apparatus 14. The plane of the monitoring region 16 can also run obliquely with respect to the horizontal.

Received beams captured by the optical component 32 are analysed with the analysis component 34, from which the distance and the relative speed of the corresponding object with respect to the motor vehicle 10 are determined.

The analysis component 34 furthermore has an electronic categorization device 46 with which the captured objects can be categorized into stationary objects and non-stationary objects. Stationary objects that extend parallel to the road 22, such as for example the crash barriers 20, can in some circumstances not be captured as a whole by the sensor apparatus 14. It can happen in the course of tracking that different partial sections of such a stationary object that appear to move along with the motor vehicle 10 are captured. This can lead to the stationary object concerned being incorrectly categorized as non-stationary. A categorization method 48, with which such errors of categorization can be avoided, is therefore carried out with the electronic categorization device 46 to distinguish the stationary objects from the non-stationary objects. The more accurate the categorization of the objects is, the better can the function of the driver assistance system be carried out. The categorization device 46 can, for example, be designed as a processor with an algorithm with which the categorization method 48 is carried out.

Figure 7:
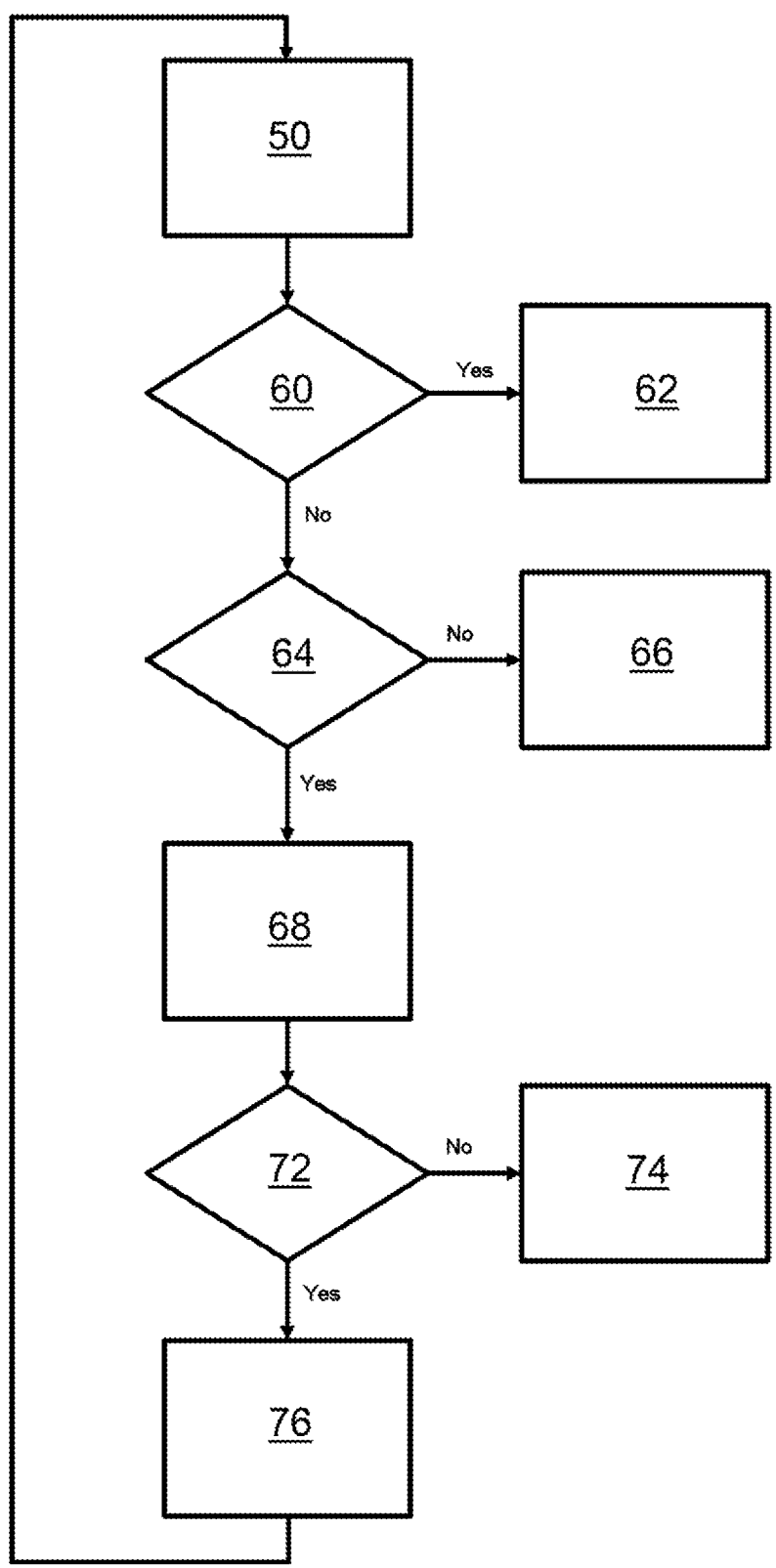
FIG. 7 shows a flow diagram of a categorization method for distinguishing between stationary objects such as crash barriers and non-stationary objects such as vehicles proceeding in front, which method is carried out with the sensor apparatus of the vehicle of FIGS. 1 and 2 in scenarios similar to those of FIGS. 3 to 6.

The categorization method 48 is illustrated in FIG. 7 as a flow diagram.

The geometry of an object, for example a vehicle 18 or a crash barrier 20, is captured in a step 50. Neighbouring object points 40 of the object 18 or 20 are allocated to a cluster 52 for this purpose. The cluster 52 is then analysed with the aid, for example, of a Douglas-Peucker algorithm. A line 54, 56 or 58 is drawn here through the cluster 52. A direction of extension of the corresponding object 18 or 20 is drawn out by the respective object points 40, and represented by the corresponding line 54, 56 or 58.

If the cluster 52 belongs to a crash barrier 20, an almost straight line 54 results. The direction of extension of the line 54 runs approximately parallel to the main monitoring direction 42. A part of such a line 54 is illustrated by way of example in FIG. 6.

Figure 3:
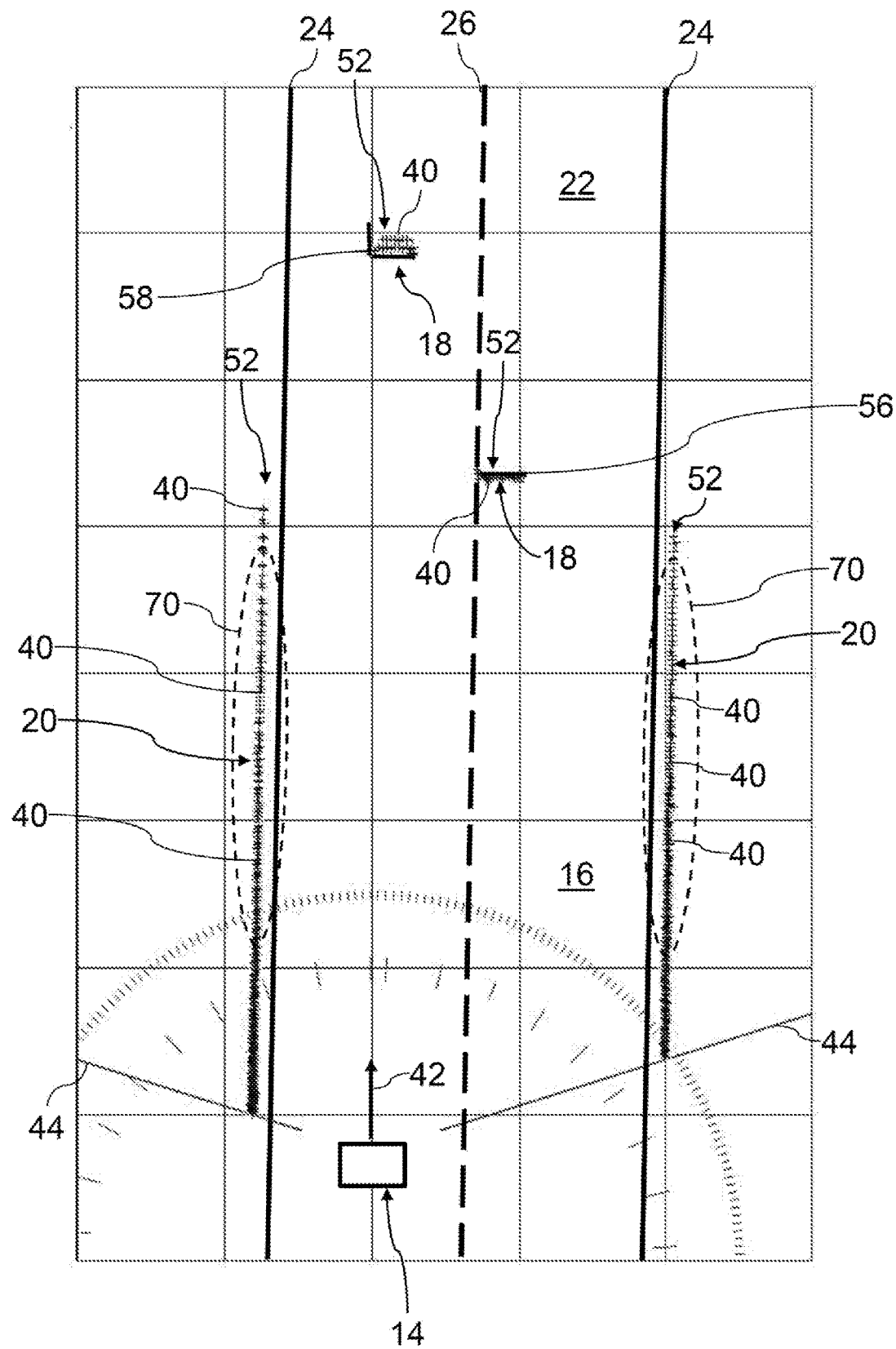
FIG. 3 shows a scenario similar to the scenario of FIG. 2, wherein the object points of crash barriers and vehicles proceeding in front that are captured with the sensor apparatus are each represented as a cross.
Figure 4:
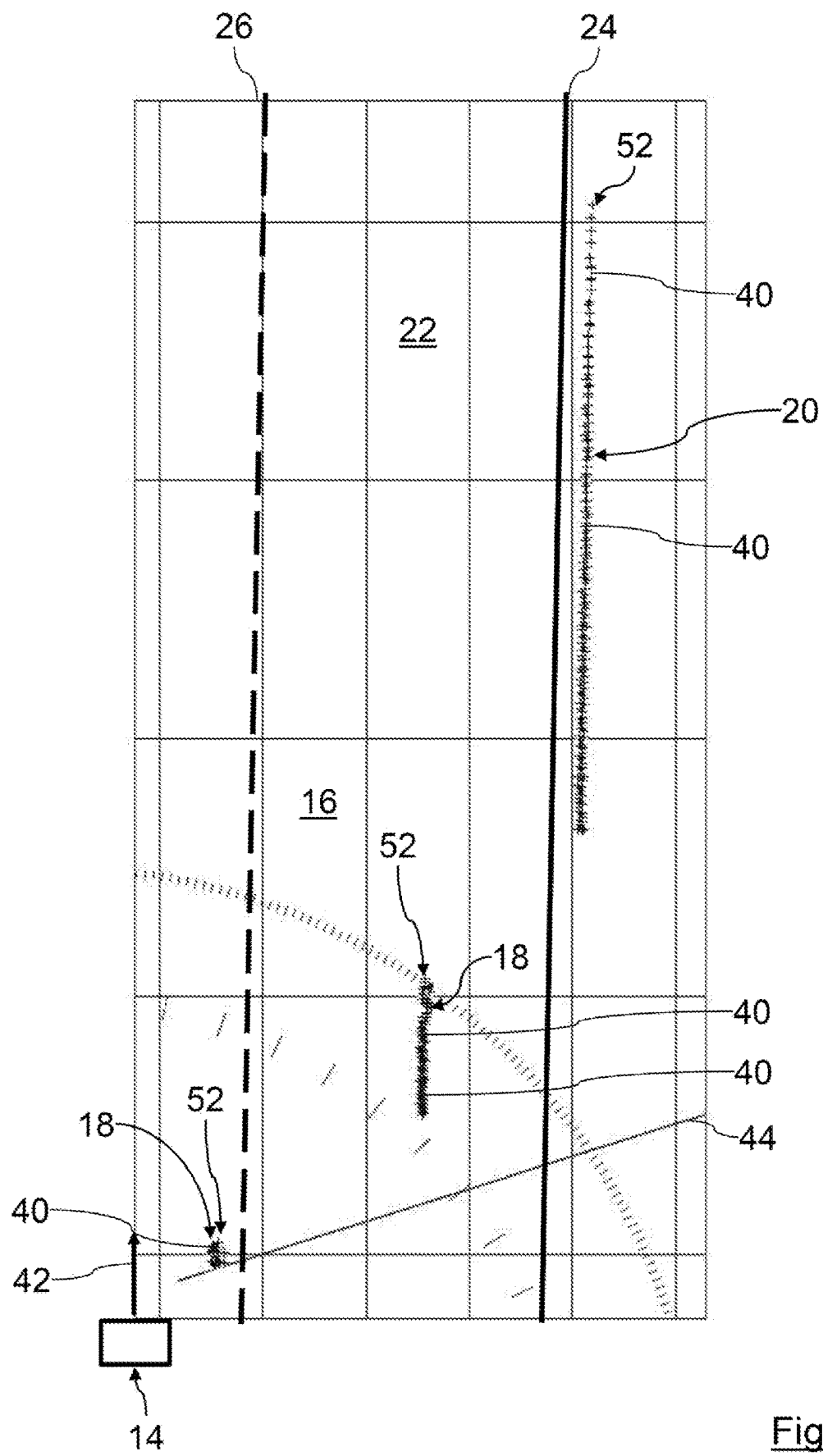
FIG. 4 shows an enlarged view of a scenario with the illustration of object points similar to the scenario of FIG. 3.
Figure 5:
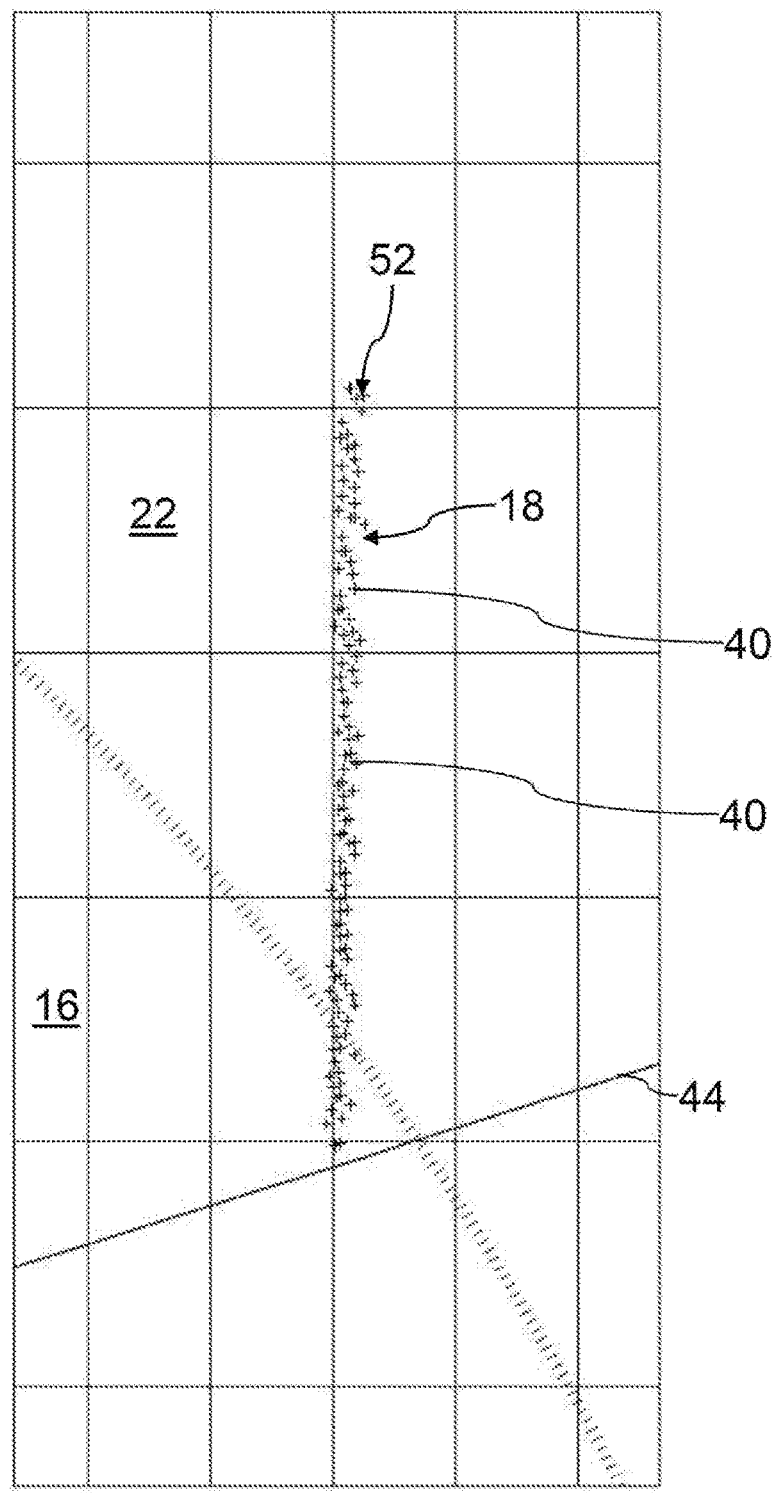
FIG. 5 shows a detailed view of a scenario similar to the scenarios of FIGS. 3 and 4, with the representation of object points of a vehicle proceeding in front.

If the cluster 52 belongs to the rear face of a vehicle 18, then a corresponding line 56, suggested in FIG. 3, runs orthogonally to the main monitoring direction 42.

In the case of a vehicle 18 that is travelling obliquely in front of the motor vehicle 10, and at which both the rear face and also the side surfaces lie in the monitoring region 16 of the sensor apparatus 14, an L-shaped line 58 suggested in FIG. 3 therefore arises. The corresponding directions of extension, that is to say the legs of the L-shape, of the line 58 run perpendicularly to one another.

In a step 60 of the categorization method 48, a check is made as to whether the line of the object 18 or 20 has an L-shape. If this, as with the line 58, is the case, it is assumed that the object is a non-stationary one, for example another vehicle 18. The method is ended with a step 62. It may be appropriate for the method to be carried out again at a later time with new data sets.

If the line of the object 18 or 20 does not have an L-shape, as is the case with the lines 54 and 56, then a check is made in step 64 as to whether the line of the object 18 or 20 runs approximately parallel to the main monitoring direction 42. If, like the line 56, the line does not run parallel to the main monitoring direction 42, it is assumed that the object is a non-stationary one, for example a vehicle 20. The method is ended with a step 66. It may be appropriate for the method to be carried out again at a later time with new data sets.

Figure 6:
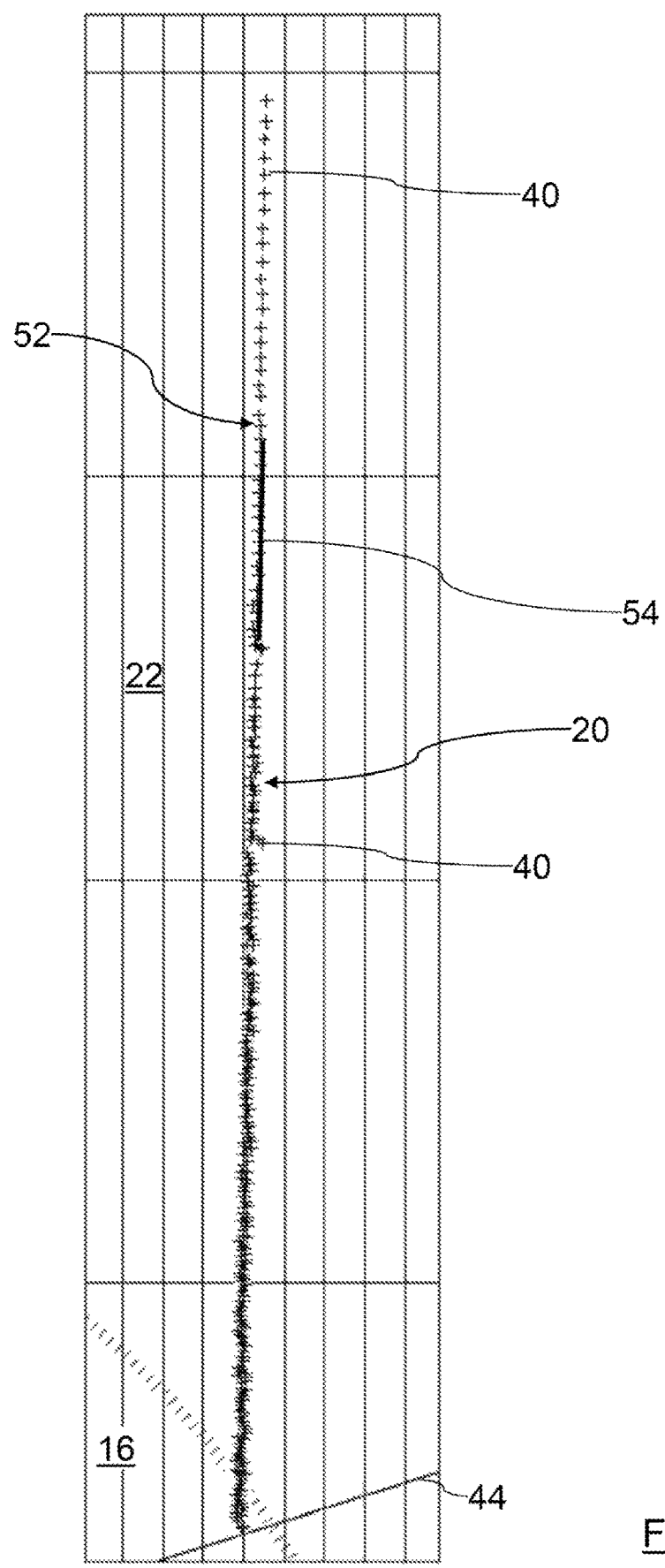
FIG. 6 shows a detailed view of a scenario similar to the scenarios of FIGS. 3 to 5, with the object points of a crash barrier.

If, on the other hand, the line of the object 18 or 20, like the line 54, does run parallel to the main monitoring direction 42, then a density of the corresponding object points 40 in a region 70 of the object 20 that is distant from the sensor apparatus 14 is determined in a step 68 with a density determination apparatus of the categorization device 46. The region 70 is suggested in FIG. 3 by corresponding dotted ellipses. A detailed view of the crash barrier 20 is shown in FIG. 6. A density of the corresponding object points 40 falls significantly with increasing distance from the sensor apparatus 14. In contrast, a density of the object points 40 at a vehicle 18 is almost constant, as is shown in detail in FIG. 5.

In a step 72, the determined density is compared with a predetermined threshold value using a comparison apparatus of the categorization device 46. The threshold value can, for example, be determined empirically at the factory, and stored in a corresponding memory device. Alternatively or in addition, the threshold value can be determined during operation of the sensor apparatus 14 in accordance with a dynamic method that is not of further interest here.

If the comparison in step 72 finds that the determined density is greater than or equal to the threshold value, then it is assumed that the object is non-stationary, for example a vehicle 18. The method is ended with a step 74. It may be appropriate for the method to be carried out again at a later time with new data sets.

If the comparison in step 72 finds that the density is smaller than the threshold value, then it is assumed that the object is stationary, for example a crash barrier 20.

If the corresponding object 20 has first been categorized as stationary, then a first probability magnitude is given a value, for example 5, in a step 76. If, following a previous execution of the categorization method 48, the object 20 has already been categorized as stationary, and a probability magnitude is already present, this probability magnitude is increased by the value of an assessment magnitude, for example 1. The assessment magnitude provides an indication that the object 18 was categorized as stationary during the last execution of the categorization method 48. The assessment magnitudes of a plurality of executions of the categorization method 48 are captured statistically with the probability magnitude, and the precision is thus increased.

The categorization method 48 is then executed again from step 50 for the same object 20.

Before ending the categorization method 48 it is optionally possible in appropriate cases in steps 62, 66 and 74 for the probability magnitude that was generated in step 76 of a previous execution of the categorization method 48 to be reduced by an appropriate assessment magnitude, for example 1, or to be increased by an appropriate opposing assessment magnitude, for example −1. A precision of the probability magnitude is thus improved further.

The probability magnitude arising successively in step 70 is supplied to the electronic apparatus 30 of the driver assistance system 12, and taken there as a basis for the control of the corresponding function apparatuses 28.

The relative speed of the corresponding object 18 relative to the motor vehicle 10 can optionally be used in the categorization method 48 for distinguishing between stationary and non-stationary objects. If the relative speed is of the general order of about 0 m/s, then this is a further indication that the object is stationary, for example in the form of a crash barrier 20. This can be used for assessing the probability that the object really is a stationary one. In this case for example, a further assessment magnitude, for example 1, can be added to the probability magnitude. It is possible to compensate in this way for example for concealments of a stationary object by a non-stationary object, for example a truck or a bus.

Additionally or as an alternative to the specification of a probability magnitude and the corresponding addition and subtraction of assessment magnitudes, other methods for the characterization and statistical processing of results of the categorization method 48 and the assessment of whether the tracked object is stationary or non-stationary can also be used.

The invention claimed is:

1. A method for optical capture of at least one object with at least one sensor apparatus of a vehicle, the method comprising:
    transmitting, by the at least one sensor apparatus, optical transmitted signals into a monitoring region; and
    capturing optical transmitted signals reflected from object points of the at least one object as received signals with angular resolution with reference to a main monitoring direction of the at least one sensor apparatus;
    determining a spatial distribution of the object points of the at least one object relative to the at least one sensor apparatus from a relationship between the transmitted signals and the received signals; and
    categorizing the at least one object as stationary or non-stationary by determining a spatial density of the captured object points in at least one region of the at least one object,
    wherein when the density of the captured object points is lower than a predeterminable or predetermined threshold value, the at least one object is categorized as stationary, and
    wherein at least one direction of extension of the at least one object is determined and, when the at least one direction of extension runs parallel and/or obliquely to the main monitoring direction, the at least one object is categorized as a stationary object.

2. The method according to claim 1, wherein the density of the captured object points is determined in a segment of the at least one object facing away from the at least one sensor apparatus.

3. The method according to claim 1, wherein at least one direction of extension of the at least one object is determined and, when at least two directions of extension of the at least one object that extend obliquely and perpendicularly, to one another are captured, the at least one object is categorized as non-stationary.

4. The method according to claim 1, wherein the method is carried out a plurality of times, and the categorizations resulting therefrom are processed statistically.

5. The method according to claim 1, wherein a relative speed of the at least one object to the vehicle is determined from a relationship between the transmitted signals and the received signals and when the relative speed is of the general order of about 0 m/s, a categorization of the at least one object is carried out on the basis of the density of the object points and/or of the direction of extension of the at least one object, otherwise no further categorization is done.

6. The method according to claim 1, wherein a distance and/or a relative speed of at least one object point of the at least one object is determined in accordance with a sampling light time-of-flight measurement method comprising a LiDAR or a LaDAR method.

7. A device of the at least one sensor apparatus of the vehicle for optical capture of the at least one object, the device being configured to perform the method according to claim 1, the device comprising:
    at least one analysis component for:
        determining the angular resolution of propagation directions of the transmitted signals and/or the received signals with reference to the main monitoring direction of the at least one sensor apparatus and
        determining the spatial distribution of the object points of the at least one object at which the transmitted signals are reflected and returned to the at least one sensor apparatus as the received signals, relative to the at least one sensor apparatus from the relationship between the transmitted signals and the received signals; and
    at least one categorization component for the categorizing of the at least one object as stationary or non-stationary,
    wherein the at least one categorization component comprises at least one density determination apparatus for determining the spatial density of the captured object points in the at least one region of the at least one object, and at least one comparison apparatus for comparing the density with the predetermined or predeterminable threshold value and for the categorizing of the at least one object as stationary or non-stationary, depending on the result of the comparison.

8. At least one sensor apparatus of a vehicle that is part of at least one of the devices according to claim 7, the at least one sensor apparatus comprising:
    at least one transmitter for transmitting the optical transmitted signals into a monitoring region;
    at least one receiver for the capture of the transmitted signals reflected at the object points of the at least one object as the received signals;
    wherein the at least one device of the at least one sensor apparatus comprises:
    at least one analysis component for determining the angular resolution of propagation directions of the transmitted signals and/or of the received signals with respect to the main monitoring direction of the at least one sensor apparatus and for determining the spatial distribution of the object points of the at least one object relative to the at least one sensor apparatus from the relationship between the transmitted signals and the received signals; and
    the at least one categorization component for the categorizing of the at least one object as stationary or non-stationary,
    wherein the at least one categorization component comprises the at least one density determination apparatus for determining the spatial density of the captured object points in the at least one region of the at least one object, and at least one comparison apparatus for comparing the density with the predetermined or predeterminable threshold value and for the categorizing of the at least one object as stationary or non-stationary, depending on the result of the comparison.

9. A driver assistance system of the vehicle with the at least one sensor apparatus according to claim 8, with the at least one device for the optical capture of the at least one object.

* * * * *